(12) United States Patent
Lewandowski et al.

(10) Patent No.: US 10,907,754 B2
(45) Date of Patent: Feb. 2, 2021

(54) COMPOSITE STRIP, AND METHODS FOR FORMING A JUNCTION BETWEEN TWO CONDUITS

(71) Applicant: TOTAL SA, Courbevoie (FR)

(72) Inventors: Alexandre Lewandowski, Pau (FR); Franck Rey-Bethbeder, Pau (FR); Dominique Delaporte, Pau (FR); Alain Lechon, Pau (FR); Maurice Geli, Lescar (FR); Yann Buzaré, Gelos (FR)

(73) Assignee: TOTAL SA, Courbevoie (FR)

( * ) Notice: Subject to any disclaimer, the term of this patent is extended or adjusted under 35 U.S.C. 154(b) by 40 days.

(21) Appl. No.: 15/104,151

(22) PCT Filed: Dec. 2, 2014

(86) PCT No.: PCT/FR2014/053126
§ 371 (c)(1),
(2) Date: Jun. 13, 2016

(87) PCT Pub. No.: WO2015/086954
PCT Pub. Date: Jun. 18, 2015

(65) Prior Publication Data
US 2017/0023159 A1    Jan. 26, 2017

(30) Foreign Application Priority Data
Dec. 12, 2013  (FR) .................... 13 62506

(51) Int. Cl.
*F16L 53/30*    (2018.01)
*F16L 13/02*    (2006.01)
(Continued)

(52) U.S. Cl.
CPC .......... *F16L 13/0272* (2013.01); *B29C 63/14* (2013.01); *B29C 65/02* (2013.01);
(Continued)

(58) Field of Classification Search
CPC .... H05B 3/286; H05B 3/50; H05B 2203/014; H05B 2203/011; H05B 2203/016;
(Continued)

(56) References Cited

U.S. PATENT DOCUMENTS 3,800,121 A    3/1974  Dean et al.
3,943,273 A    3/1976  De Putter
(Continued)

FOREIGN PATENT DOCUMENTS

CN    2800021 Y    7/2006
DE    203 11 617 U1    12/2004
(Continued)

OTHER PUBLICATIONS

Machine translation of DE 20311617 date unknown.*
(Continued)

*Primary Examiner* — Matthew D Matzek
(74) *Attorney, Agent, or Firm* — Patterson Thuente Pedersen, P.A.

(57) ABSTRACT

A composite strip which extends in a main direction between first and second ends and which comprises a main strip comprising first fibres embedded in a matrix. The first fibres are made of carbon, an electrically conducting material, and the matrix is made up of at least one polymer. The composite strip further comprises a junction layer formed of an electrically conducting junction material. The junction layer is placed on the main strip.

12 Claims, 5 Drawing Sheets

(51) Int. Cl.

| | |
|---|---|
| *B29C 65/00* | (2006.01) |
| *B29C 63/14* | (2006.01) |
| *B29C 65/02* | (2006.01) |
| *F16L 59/20* | (2006.01) |
| *F16L 25/01* | (2006.01) |
| *F16L 58/18* | (2006.01) |
| *F16L 53/37* | (2018.01) |
| *B32B 7/00* | (2019.01) |
| *B32B 27/08* | (2006.01) |
| *B32B 27/06* | (2006.01) |
| *B32B 5/26* | (2006.01) |
| *B32B 27/34* | (2006.01) |
| *B32B 27/30* | (2006.01) |
| *B32B 5/02* | (2006.01) |
| *B32B 5/30* | (2006.01) |
| *B29L 23/00* | (2006.01) |
| *B29K 27/00* | (2006.01) |
| *B29K 77/00* | (2006.01) |
| *B29K 105/00* | (2006.01) |

(52) U.S. Cl.
CPC ...... *B29C 66/1122* (2013.01); *B29C 66/1142* (2013.01); *B29C 66/5221* (2013.01); *B29C 66/5326* (2013.01); *B29C 66/723* (2013.01); *B29C 66/7212* (2013.01); *B29C 66/72321* (2013.01); *B29C 66/7394* (2013.01); *B29C 66/73141* (2013.01); *B32B 5/024* (2013.01); *B32B 5/26* (2013.01); *B32B 5/30* (2013.01); *B32B 7/00* (2013.01); *B32B 27/06* (2013.01); *B32B 27/08* (2013.01); *B32B 27/304* (2013.01); *B32B 27/34* (2013.01); *F16L 25/01* (2013.01); *F16L 53/37* (2018.01); *F16L 58/181* (2013.01); *F16L 59/20* (2013.01); *B29C 66/1222* (2013.01); *B29C 66/1226* (2013.01); *B29C 66/71* (2013.01); *B29K 2027/16* (2013.01); *B29K 2077/00* (2013.01); *B29K 2105/258* (2013.01); *B29K 2995/0005* (2013.01); *B29K 2995/0007* (2013.01); *B29L 2023/225* (2013.01); *B32B 2260/021* (2013.01); *B32B 2260/025* (2013.01); *B32B 2260/046* (2013.01); *B32B 2262/0269* (2013.01); *B32B 2262/101* (2013.01); *B32B 2262/103* (2013.01); *B32B 2262/106* (2013.01); *B32B 2264/105* (2013.01); *B32B 2307/202* (2013.01); *B32B 2307/206* (2013.01); *B32B 2307/732* (2013.01); *B32B 2405/00* (2013.01)

(58) Field of Classification Search
CPC . F16L 53/50; F16L 53/34; F16L 53/38; B29C 63/02; B29C 63/04; B29C 63/06; B29C 63/12; B29C 63/14

USPC ........ 392/468, 465; 219/200, 507, 520, 528, 219/529, 535, 545; 428/357, 364, 367, 428/368

See application file for complete search history.

(56) References Cited

U.S. PATENT DOCUMENTS

| | | | | |
|---|---|---|---|---|
| 4,791,277 | A | * | 12/1988 | Montierth ................ E03B 7/12 219/535 |
| 2009/0107558 | A1 | | 4/2009 | Quigley et al. |
| 2010/0290764 | A1 | | 11/2010 | Borgmeier et al. |
| 2013/0025728 | A1 | | 1/2013 | Bigex et al. |
| 2013/0028580 | A1 | | 1/2013 | Bigex et al. |
| 2013/0048128 | A1 | | 2/2013 | Roederer et al. |
| 2013/0064528 | A1 | * | 3/2013 | Bigex ..................... H05B 3/36 392/468 |
| 2013/0087278 | A1 | | 4/2013 | Chang et al. |
| 2013/0108250 | A1 | | 5/2013 | Bigex et al. |
| 2013/0336643 | A1 | | 12/2013 | Borgmeier et al. |
| 2015/0359644 | A1 | * | 12/2015 | Sanders ................ A61F 2/7812 623/34 |

FOREIGN PATENT DOCUMENTS

| | | | | |
|---|---|---|---|---|
| DE | 203 11 617 | U1 | * 12/2004 | ........ B29C 61/0616 |
| DE | 20 2008 003 365 | A1 | 8/2009 | |
| DE | 10 2010 010 929 | A1 | 9/2011 | |
| FR | 2 132 759 | | 11/1972 | |
| FR | 2 220 120 | | 9/1974 | |
| FR | 2 958 991 | A1 | 10/2011 | |
| FR | 2 958 992 | A1 | 10/2011 | |
| FR | 2 958 994 | A1 | 10/2011 | |
| FR | 2 958 995 | A1 | 10/2011 | |
| GB | 2 403 995 | A | 1/2005 | |
| WO | WO 02/104074 | A1 | 12/2002 | |
| WO | WO 2006/077157 | A1 | 7/2006 | |
| WO | WO 2011/128544 | A1 | 10/2011 | |
| WO | WO 2011/128545 | A1 | 10/2011 | |
| WO | WO 2011/128546 | A1 | 10/2011 | |
| WO | WO 2011/128547 | A1 | 10/2011 | |
| WO | WO-2011128546 | A1 | * 10/2011 | ............... H05B 3/36 |

OTHER PUBLICATIONS

Search Report for related French Application No. FR 1362506 dated Jul. 22, 2014; 2 pages.
Search Report for related French Application No. FR 1362507 dated Aug. 19, 2014; 2 pages.
Search Report for related French Application No. FR 1362509 dated Jul. 25, 2014; 2 pages.
International Search Report for related International Application No. PCT/FR2014/053135 dated Mar. 9, 2015; 7 pages.
International Search Report for related International Application No. PCT/FR2014/053186 dated Apr. 7, 2015; 7 pages.
International Search Report for related International Application No. PCT/FR2014/053126 dated Mar. 10, 2015; 8 pages.

* cited by examiner

COMPOSITE STRIP, AND METHODS FOR FORMING A JUNCTION BETWEEN TWO CONDUITS

RELATED APPLICATIONS

The present application is a National Phase entry of PCT Application No. PCT/FR2014/053126, filed Dec. 2, 2014, which claims priority from FR Patent Application 13 62506, filed Dec. 12, 2013, said applications being hereby incorporated by reference herein in their entirety.

FIELD OF THE INVENTION

The present invention relates to a composite strip for forming a joint between two pipes, and to the methods for forming the said joint.

BACKGROUND OF THE INVENTION

The invention relates to a composite strip that extends in a main direction between first and second ends, the said composite strip comprising a main strip comprising first fibres embedded in a matrix, the said first fibres being made of carbon, a material that conducts electricity, and the said matrix being made of at least one polymer.

Furthermore, an object of the invention is to form a joint between two pipes used for transporting a fluid, for example a fluid containing a hydrocarbon (a pipeline). Some of these pipes comprise an electrically conducting composite layer. This type of pipe is used, for example, in extremely cold environments, on land and at sea, and sometimes at sea at very great depths. Under these conditions, the fluid may freeze, coagulate, set, thicken or form deposits of paraffin or of hydrate. These transformations of the fluid may cause blockages and impede the transport of the fluid along the pipe. This is why these pipes are sometimes heated in order to avoid such disadvantages. One known technique is to heat these pipes electrically using conducting lines made of copper positioned around the pipes.

Document CN2800021-Y describes such a pipe for transporting a hydrocarbon, with a glass-fibre reinforced plastic tube and a first layer of carbon fibre supplied with electricity to heat the tube.

However, the pipes needed for transporting hydrocarbons are extremely long, potentially as much as several kilometres long. The abovementioned document does not propose any solution either for mechanically connecting pipes one after the other or for electrically connecting together the electricity-conducting layers of these pipes.

Document FR2958991 describes such an improved pipe for transporting a hydrocarbon, which further comprises a reinforcing layer suited to improving mechanical integrity. That document also describes means of assembling pipes with one another, further comprising means of supplying electricity to the heating layer.

However, these means of connection between the pipes are complex. It is therefore necessary to find other solutions for joining or connecting the pipes together.

SUMMARY OF THE INVENTION

It is an object of the present invention to improve a composite strip of the aforementioned type, notably in order to make the mechanical and electrical joint between carbon heating layers of pipes for transporting hydrocarbons.

To this end, the composite strip is characterized in that it further comprises a junction layer formed of an electrically conducting junction material, the said junction layer being placed on the main strip.

Thanks to these arrangements, the preformed composite strip is suited to being used immediately for making the electrical joint between heating layers of two pipes butted together end to end.

In addition, the electrical joint is highly effective because the materials of the heating layers and of the composite strip naturally weld together and because the junction layer of the composite strip has very good electrical properties. The composite strip is therefore able to form an electrical joint that has low electrical resistance, making it possible to avoid electrical losses through a Joule heating effect between each pipe, and making it possible to avoid localized overheating that could damage the assembled hydrocarbon pipeline.

In addition, the mechanical joint is mechanically very strong. The assembled hydrocarbon pipeline is almost continuous between the adjacent first and second pipes. Localized mechanical weaknesses at each joint are thus eliminated.

In various embodiments of the composite strip according to the invention, it is possible also to resort to one and/or another of the following measures.

According to one aspect of the invention, the junction layer is placed only at the first and second ends of the composite strip.

According to one aspect of the invention, the junction layer has the form of strips extending along the first and second ends, each of the said strips having, in the main direction, a width greater than 1 cm and preferably greater than 5 cm.

According to one aspect of the invention, the junction layer has a thickness of between 0.05 mm and 1 mm.

According to one aspect of the invention, the junction material is chosen from a list comprising a polymer filled with electrically conducting particles, a polymer filled with metallic particles, a polymer filled with silver particles, a polymer filled with metalized carbon fibres, a polymer filled with copper fibres, a polymer filled with braided copper fibres.

According to one aspect of the invention, the first fibres extend in the main direction.

According to one aspect of the invention, the first fibres extend substantially in a fibre direction forming a fibre angle with the main direction, the said fibre angle being between 0 degrees and 45 degrees and preferably between 0 degrees and 10 degrees.

According to one aspect of the invention, the composite strip has the shape of a trapezium having two lateral edges that extend in directions parallel to one another and two end edges which belong to the ends of the composite strip and which extend in directions that converge towards one another, the junction layer extending parallel to each end edge.

According to one aspect of the invention, the end edges form an angle of convergence of between 0.1 degree and 20 degrees, and preferably between 0.1 degree and 5 degrees.

According to one aspect of the invention, the composite strip further comprises a lateral portion in a secondary direction substantially perpendicular to the main direction, the said lateral portion not comprising the said first fibres and comprising second fibres embedded in the matrix, the said second fibres being formed of a second material that is not electrically conducting.

According to one aspect of the invention, the second material is glass.

The invention also relates to a method for forming a joint between a first pipe and a second pipe. Each pipe comprises an internal hollow tube and a heating layer situated in the thickness of the said pipe, the said heating layer comprising fibres formed of a conducting material.

In the method, a composite strip is provided and extends in a main direction between first and second ends, the said composite strip comprising a main strip comprising first fibres embedded in a matrix, the said first fibres being made of carbon, a material that conducts electricity, the said matrix being made of at least one polymer, and the said composite strip further comprising a junction layer formed of an electrically conducting junction material, the said junction layer being placed on the main strip.

In the method, an electrical joint is made between the first and second pipes by performing the following step: the composite strip is applied to each heating layer or to a layer placed beforehand on the said heating layers by winding around the tubes, the junction layer of the composite strip is brought into contact with the heating layer of the first pipe and with the heating layer of the second pipe.

In various embodiments of the method according to the invention, it is possible further to resort to one and/or the other of the following measures.

According to one aspect of the invention, the junction layer is placed only at the ends of the composite strip, and the junction layer of the first end is brought into contact with the heating layer of the first pipe and the junction layer of the second end is brought into contact with the heating layer of the second pipe.

According to one aspect of the invention, each pipe has an end of substantially conical shape at least in the thickness of the heating layer, and a composite strip is chosen that has a trapezium shape with a geometry matched to the shapes of the ends of the pipes so that during the electrical-jointing step, the composite strip forms a joint of a shape that substantially complements the conical ends of the heating layers of the pipes by the winding of the trapezium-shaped composite strip around the tubes.

According to one aspect of the invention, the first and second ends of the pipes are machined first of all in order to uncover a cylindrical portion of each tube and to make a conical shape in at least the heating layer of each tube.

According to one aspect of the invention, prior to the electrical-jointing step, a step of welding the tube of the first pipe to the tube of the second pipe is performed.

According to one aspect of the invention, an insulation-jointing step is performed after the welding step and before the electrical-jointing step, and involves applying an insulating strip comprising second fibres embedded in a matrix, the said second fibres being formed of a second material that is not electrically conducting, said second material being, for example, glass.

According to one aspect of the invention, after the step of applying a composite strip, a heating step is performed during which the composite strip applied between the first and second pipes is heated in order to crosslink the matrix of the composite strip.

The invention also relates to a method for forming a joint between a first pipe and a second pipe, in which method each pipe comprises an internal hollow tube and a heating layer situated in the thickness of the said pipe, the said heating layer comprising fibres formed of a conducting material.

In the method, a main strip is supplied and comprises first fibres embedded in a matrix, the said first fibres being made of an electrically conducting material, and the said matrix being made of at least one polymer.

In the method, an electrical junction is made between the first and second pipes by performing the following steps:
a junction layer is applied to each heating layer or around a layer placed on the said heating layers beforehand, each junction layer being made up of an electrically conducting junction material, and the junction layers are brought into contact with the heating layer of the first pipe and with the heating layer of the second pipe, and the main strip is applied to the said junction layer by winding around the tubes.

BRIEF DESCRIPTION OF THE DRAWINGS

Other features and advantages of the invention will become apparent during the following description of at least one embodiment thereof, given by way of nonlimiting example with reference to the attached drawings.

In the drawings:

FIG. 1b is a transverse side view of the pipe of FIG. 1a;

In the various figures, the same numerical references denote elements that are identical or similar.

DETAILED DESCRIPTION OF THE DRAWINGS

In the present description, the terms "front" and "rear" are used with reference to the longitudinal direction X. The terms "upper" or "upwards" and "lower" or "downwards" are used with reference to the vertical direction Z, upwards, perpendicular to the longitudinal direction X and to the transverse direction Y.

The term "pipe" in the present invention is to be understood as being a device comprising a tube for transporting a fluid at least between an inlet and an outlet, it being possible for the device to comprise other elements, such as a valve, or multiple branches.

Figure 1A:
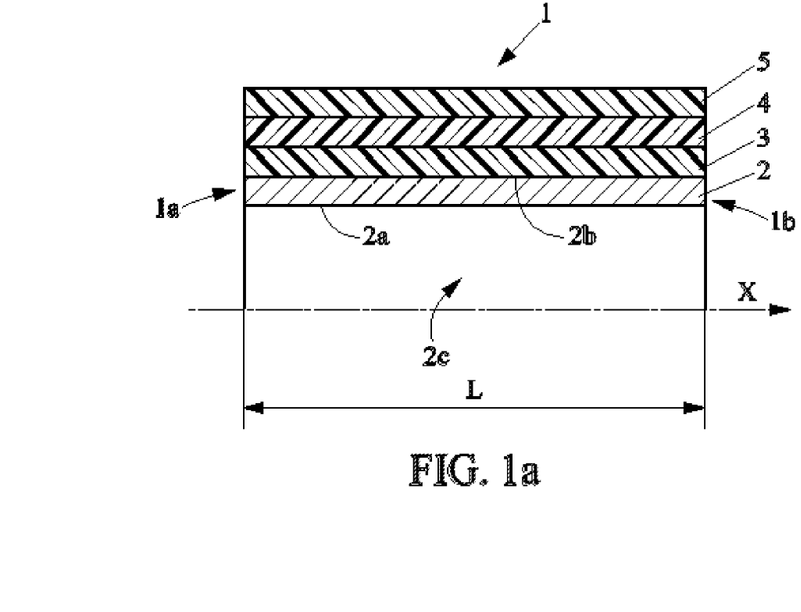
FIG. 1a is a view in longitudinal section of a composite heating pipe.
Figure 1B:
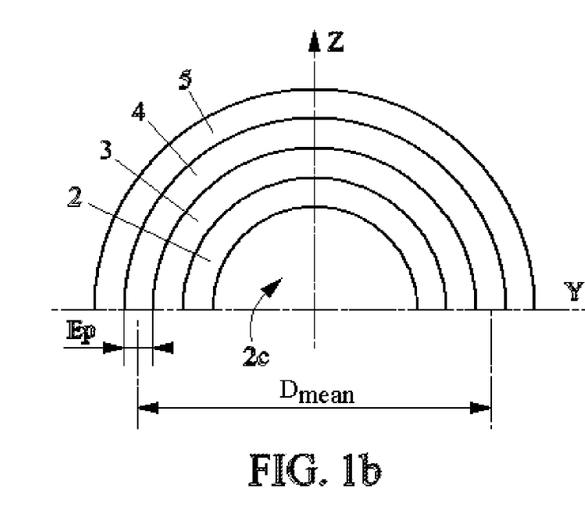

FIGS. 1a and 1b show a pipe 1 of the heating type, and comprising a composite material, depicted in longitudinal section on a plane XZ and in transverse section on a plane YZ. In these figures, only an upper half above the axis X is shown, the lower other half being substantially identical by symmetry with respect to the axis X.

The pipe 1 comprises a hollow tube 2, extending in the longitudinal direction of axis X between a first and a second end 1a, 1b of the pipe. This tube 2 comprises an internal surface 2a near the axis X, and an external surface 2b further away from the axis X. On the inside of the internal surface 2a there extends a cavity 2c between an inlet and an outlet of the cavity which inlet and outlet are situated at each of the ends. The cavity 2c is suited to transporting the fluid between the said inlet and the said outlet.

The pipe 1 has a cross section of substantially cylindrical shape in the YZ plane, although other shapes could be achieved.

The tube 2 may be produced using an electrically conducting material, such as steel, as has been depicted in the figures for the present embodiment of the pipe.

The tube 2 may be made from an electrically insulating material, for example a polymer. This material may advantageously be a polyamide (PA) or a polyvinylidene fluoride (PVDF).

On this tube 2 there are, for example, the following layers, from the inside (nearest the axis X) towards the outside (away from the axis X):
a first insulating layer 3
a heating layer 4, and
a second insulating layer 5.

The first and second electrically insulating layers 3, 5 are electrically insulating. They are made up, for example, of a polymer or a composite containing glass fibres embedded in the polymer (matrix) or a composite containing Kevlar fibres embedded in the polymer. The polymer is advantageously suited to adhering well to the other layers: the tube 2 and the heating layer 4. This polymer may be identical to the polymer used in the heating layer 4 and/or in the tube 2 as mentioned hereinabove.

The heating layer 4 is a composite comprising at least carbon fibres embedded in a polymer. This polymer may advantageously be a polyamide (PA) or a polyvinylidene fluoride (PVDF).

The carbon fibres are able to conduct an electrical current in order to heat the tube through a Joule heating effect. The electrical resistance R of such a heating layer 4 between the first and second ends (1a, 1b) of the pipe can be calculated approximately using the following formula:
in which:

$$R = \rho_{fibre} \cdot \frac{L}{\pi \cdot D_{mean} \cdot E_p \cdot \cos^2\alpha}.$$

$\rho_{fibre}$ is the resistivity of the carbon fibres, for example having the value $\rho_{fibre}=1.9 \times 10^{-5}$ Ωm at a temperature of 20° C., which is substantially 1100 times more resistive than copper at 20° C., L is a length of the heating layer 4 between the first and second ends (1a, 1b) in the longitudinal direction X, $D_{mean}$ is a mean diameter of the heating layer 3, $E_p$ is a thickness of the heating layer in a transverse direction, and α is an angle of inclination that carbon fibres make with respect to the direction of the axis X.

Because of the angle of inclination of the carbon fibres in the heating layer 4 it is possible to obtain a desired electrical resistance R of the heating.

By virtue of this heating layer 4 comprising carbon fibres well distributed in the polymer material of this layer, the heating around the tube 2 is more uniform. Furthermore, if one or several carbon fibres become broken at a point on the pipe, the electrical current can nevertheless continue to pass via the other carbon fibres that have not broken. Thus, the electrical properties (resistance) are not greatly downgraded.

The various layers of the pipe 1 may be manufactured by known means using preformed composite strips, each preformed strip extending in a direction and comprising fibres (carbon, glass or Kevlar) embedded in a polymer matrix. The fibres may be oriented in the said direction of the preformed strip.

It is an object of the present invention also to use composite strips in order to make a mechanical and electrical joint between the layers of two pipes 1 which are butted together end to end.

Notably, one object of the invention is to use a special-purpose composite strip 10 for making the joint between the heating layer 4 of the first pipe and the heating layer 4 of the second pipe.

Figure 2:
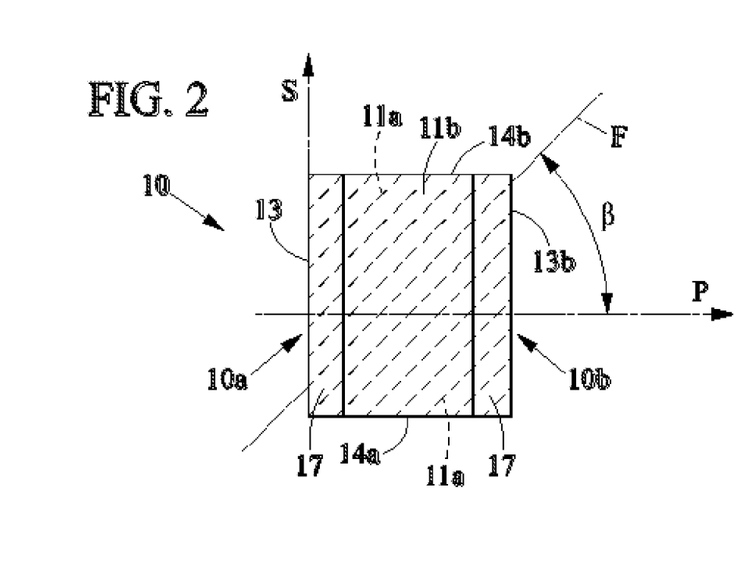
FIG. 2 is a plan view of a composite strip according to a first embodiment of the invention.

In FIG. 2, the composite strip 10 extends in a main direction P between first and second ends 10a, 10b, the second end being the opposite end of the first end in the main direction P. Each end 10a, 10b comprises an end edge 13a, 13b, respectively. In a secondary direction S substantially perpendicular to the main direction P it further comprises two lateral edges 14a, 14b which are opposite to one another. The lateral edges 14a, 14b extend between the two ends 10a, 10b of the composite strip. The composite strip 10 thus, for example, has the overall shape of a quadrilateral, which may be a square, a rectangle or a trapezium.

The composite strip 10 firstly comprises fibres 11a (first fibres) embedded in a matrix 11b. The matrix 11b and the fibres 11a form an entity referred to as the main strip 11, having a shape that is substantially planar in a plane of directions P-S. The main strip 11 thus has an upper face 15a and a lower face 15b.

These first fibres 11a are formed of a first electrically conducting material and extend in a fibre direction F. The conducting first material is advantageously carbon, like for the fibres of the heating layer 4 of the pipe 1.

The matrix 11b is made up of at least one polymer. The polymer may advantageously be a polyamide (PA) or a polyvinylidene fluoride (PVDF), like for the matrix of the heating layer 4 of the pipe 1.

The composite strip 10 of the first embodiment of FIG. 2 further comprises, near each of the ends or end edges 13a, 13b, a junction layer 17 formed of a junction material which is likewise electrically conducting. This junction layer 17 is situated on top of the main strip 11, i.e. on top of the first fibres 11a and of the matrix 11b. This junction layer 17 has the purpose of improving conduction of electricity of the composite strip 10 at its ends, which are intended to be in contact with a heating layer 4 of a pipe 1.

Figure 3:
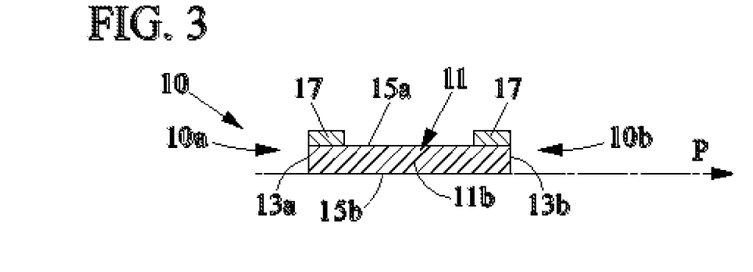
FIG. 3 is a view in cross section of FIG. 2.

This junction layer 17 is visible in cross section in FIG. 3. It takes the form of a strip which extends along each end 10a, 10b, each one having a width in the main direction P, for example of 1 cm or more, and for example greater than 5 cm. It has a thickness of between 0.05 mm and 1 mm.

This composite strip 10 is therefore a compound ready for use to make the joint between the heating layers 4 of two pipes 1.

The junction material is advantageously a polymer filled with electrically conducting particles, or a polymer filled with metallic particles, or a polymer filled with silver particles, or a polymer filled with metallized carbon fibres, or a polymer filled with copper fibres, or a polymer filled with braided copper fibres.

The particles are small-sized elements of spherical, elliptical or any other shape. They have a size (largest dimension) for example smaller than 0.1 mm, and preferably smaller than 0.01 mm. These particles may thus be mixed into or serve as a filler for a polymer without having a great effect on the viscosity thereof. These particles are therefore in the form of powder.

During a step of transforming the composite strip by heating, the junction material of the junction layer 17 will bond intimately with the matrix and with the first fibres 11a, to improve the conduction of electricity of a zone around the said junction layer 17 at the end of the composite strip 10. Electrical conduction and contact with a heating layer 4 of a pipe 1 are thus greatly improved.

The first fibres 11a possibly extend in the main direction P of the composite strip 10. The composite strip is thus easier to produce.

The first fibres 11a advantageously extend in a fibre direction F that is inclined with respect to the main direction P, with a predetermined fibre angle β. The fibre angle β is, for example, between 0 degrees and 45 degrees. Advantageously, it is between 0 degrees and 10 degrees.

The fibre angle β of the composite strip may possibly differ from the angle of inclination α of the carbon fibres of the heating layer 4 of the pipes 1. Notably, the fibre angle β is advantageously smaller than the angle of inclination α. The linear electrical resistance in the direction of the axis X of the joint 6 is therefore lower than the linear electrical resistance of the pipe. Heating at the joint is therefore reduced, and may even be eliminated.

According to the embodiment of FIG. 2, the composite strip 10 is of rectangular shape.

Figure 4:
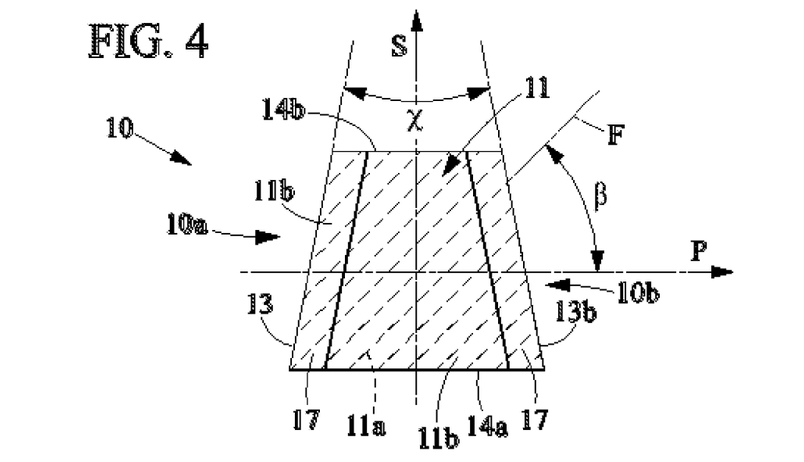
FIG. 4 is a plan view of a composite strip according to a second embodiment of the invention.

According to the embodiment of FIG. 4, the composite strip 10 is in the shape of a trapezium: the end edges 13a, 13b extend in directions that converge towards one another, forming an angle of convergence x, for example of between 0.1 degree and 20 degrees, and preferably between 0.1 degree and 5 degrees.

This angle of convergence is advantageously suited to the shapes of the heating layers 4 of the pipes 1 that are to be joined.

Figure 5:
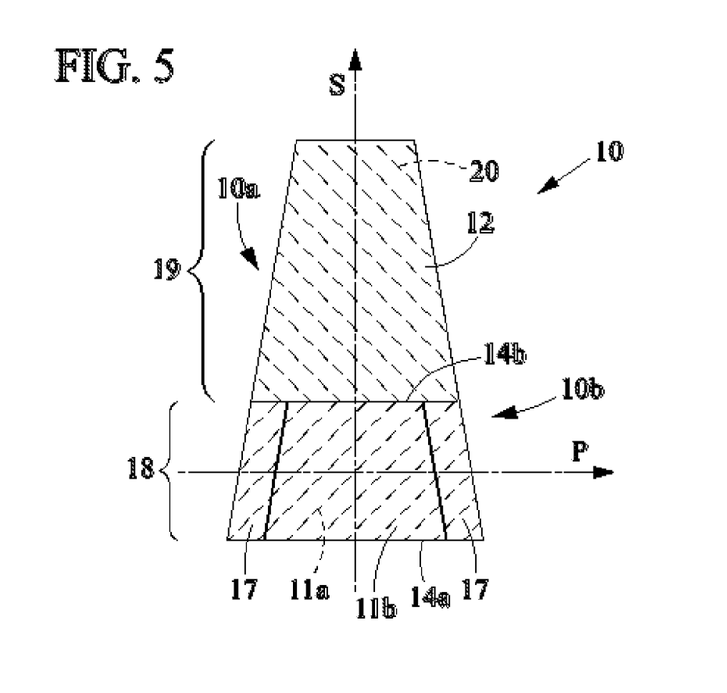
FIG. 5 is a plan view of a composite strip according to a third embodiment of the invention.

According to the embodiment of FIG. 5, the composite strip 10 comprises:
- a main portion 18 corresponding to the composite strip 10 of the embodiments of FIGS. 2 to 4, namely comprising conducting first fibres 11a, and
- a secondary portion 19 which extends in the secondary direction S from the lateral edge 14a of the main portion 18, the said secondary portion 19 not containing the said first fibres and containing second fibres 20 embedded in the matrix 11b, the said second fibres 20 being formed of a second material that is not electrically conducting.

The second material is, for example, glass.

The composite strip 10 is a continuous assembly of material comprising, continuously and juxtaposed, the first and second portions 18, 20. This composite strip 10 is thus ready for use to form a joint between two heating layers 4 and a joint between two insulating layers 3 or 5.

By virtue of this composite strip it is possible to make a joint of several or all the layers using a single winding of the special-purpose composite strip 10, and notably to make a joint between an insulating layer and a heating layer (between two pipes).

According to another embodiment (not depicted), the composite strip comprises a main portion 18 and two secondary portions 19 one on each side of the said main portion 18, in the secondary direction.

Thanks to this composite strip, it is possible to make a joint of several or all the layers using a single winding of the special-purpose composite strip 10, and notably to make a joint of the heating layer 4 and the two insulating layers 3 and 5 one on each side of the heating layer (between two pipes).

According to alternative forms of all the above embodiments of the composite strip, the junction layer 17 may be situated at various points on (or in contact with) the main strip 11. FIGS. 6 to 9 show cross sections similar to the cross section of FIG. 3, and which explain these various locations.

Figure 6:
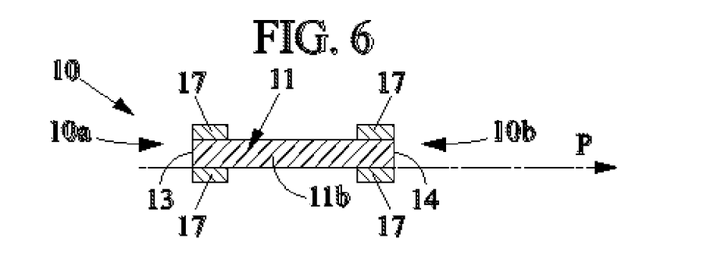
FIGS. 6 to 9 depict sections similar to FIG. 3 of alternative forms of composite strips that can be applied to each of the embodiments of FIGS. 2 to 5.

In the alternative form of FIG. 6, the junction layer 17 is situated at each of the ends 10a, 10b in strips extending along the end edges and arranged on the upper face 15a and under the lower face 15b of the main strip 11. The junction layer 17 thus comprises four strips.

Figure 7:
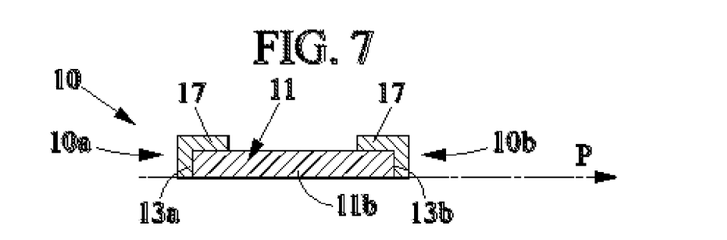

In the alternative form of FIG. 7, the junction layer is situated at each of the ends 10a, 10b in strips extending along the end edges, and covers a strip of the upper face 15a and the end edge 13a, 13b. The junction layer 17 thus comprises two strips of L-shaped cross section.

Figure 8:
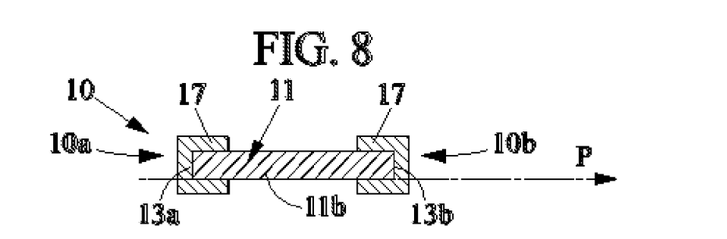

In the alternative form of FIG. 8, the junction layer 17 is situated at each of the ends 10a, 10b in strips extending along the end edges, on the upper face 15a, under the lower face 15b, and on the end edge 13a, 13b in order to connect the strips of the upper and lower faces. The junction layer 17 therefore comprises two strips of C-shaped cross section which includes each end edge.

Figure 9:
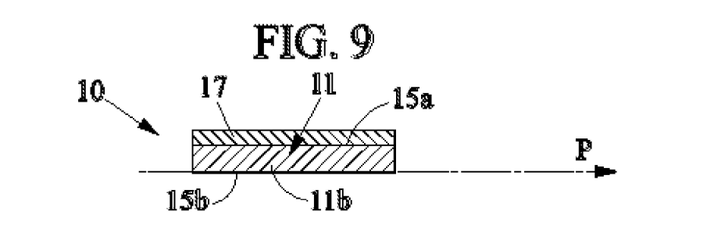

In the alternative form of FIG. 9, the junction layer 17 is situated on the entire surface of the upper face 15a (and/or lower face 15b). It thus connects each end 10a, 10b. The junction layer 17 therefore covers the entirety of the said surface of the main strip 11.

In each of these alternative forms, the conduction of electricity that can be achieved in a joint between two pipes with such a composite strip is thus reduced.

A method for forming a joint between two pipes 1 of the type of FIG. 1 will now be explained. These pipes 1 comprise an internal hollow tube 2 and successive layers of materials. One of the layers is a heating layer 4 allowing the pipe to be heated by electrical conduction. This heating layer 4 is situated within the thickness of the pipe, i.e. in a range of radial distances relative to the axis X of the pipe. The heating layer 4 comprises fibres made of conducting material, such as carbon fibres.

This method employs one of the composite strips 10 previously described for connecting the heating layers 4 of two pipes 1 butted together end to end.

Notably, the method comprises an electrical jointing process in which at least the following step is performed:
- the composite strip 10 is applied to each heating layer 4 or to a layer placed beforehand on the said heating layers by winding around the tubes 2. The junction layer 17 of the composite strip 10 is then brought into contact with the heating layer 4 of the first pipe and with the heating layer 4 of the second pipe.

FIGS. 10 to 13 show a more detailed example of how this method is implemented.

Figure 10:
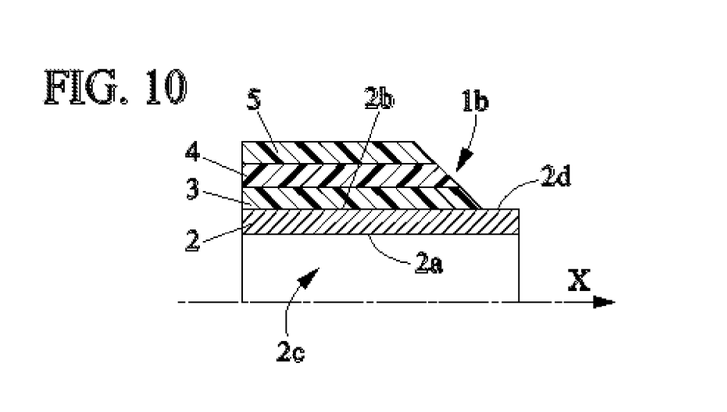
FIG. 10 is a view in longitudinal section of a composite heating pipe prepared to be joined to another heating pipe.

In FIG. 10, the second end 1b of a pipe 1 is formed for example with the shape shown either at the factory or at the time of joining two successive (adjacent) pipes together.

A cylindrical portion 2d of the external surface 2b of the tube is uncovered (with no layer on top), and the layers on top of the tube 2 are formed into a cone shape with the cone extending towards the end 1b of the pipe.

This second end 1b is, for example, formed by machining a completely cylindrical pipe as shown in FIG. 1.

Figure 11:
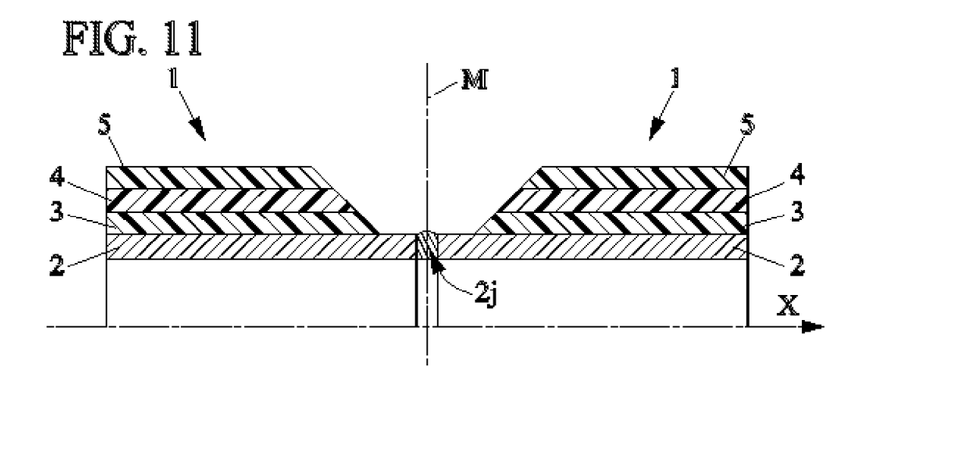
FIG. 11 is a view in longitudinal section of two heating pipes of the type of FIG. 6, the tubes of which pipes have been welded end to end.

In FIG. 11, two pipes 1 each having its ends shaped as explained hereinabove are brought together until they are coaxial of axis X and in contact via their ends in a median plan M: the second end 1b of the first pipe is in contact with the first end 1a of the second pipe. The two tubes 2 of each pipe are then welded together in a welding step to form a continuous internal tube 2 for transporting the hydrocarbon fluid. A tube joint 2j is therefore formed by welding together the two tubes 2 of the pipes 1.

Figure 12:
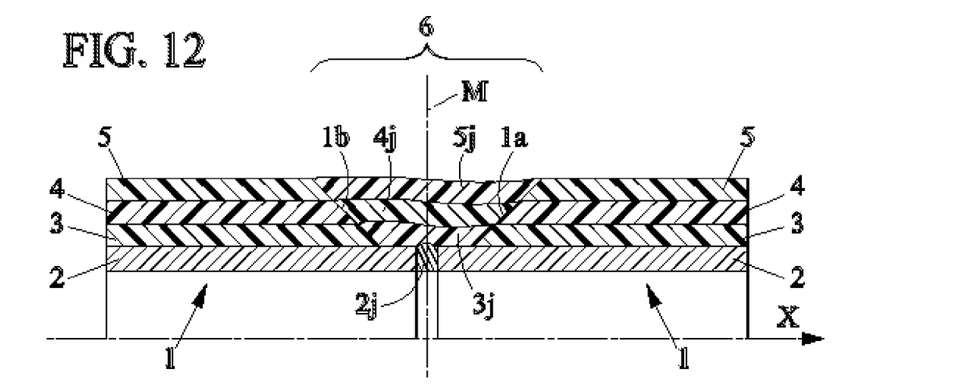
FIG. 12 is a view in longitudinal section of two heating pipes of the type of FIG. 6 the ends of which pipes have been joined by a junction that has a conducting layer.

In FIG. 12, junction layers are then created on the tube junction 2j in order to join the respective layers of each pipe 1. Thus, the following steps are performed:

a) a first insulation-jointing step, in which an insulating strip containing second fibres embedded in a polymer matrix is applied, the said second fibres being formed of a second material that is not electrically conducting, such as glass; a first insulation layer joint 3j is thus formed and joins together the first insulating layers 3 of the two pipes 1 on top of the tube joint 2j;

b) an electrical-jointing step in which a composite strip 10 is applied by winding around the insulating layer 3j, the junction layers 17 of each end of the composite strip being in contact with each heating layer 4 of the two pipes 1; a heating layer joint 4j is thus made and joins the said heating layers 4 on top of the insulation layer joint 3j; and c) a second insulation-jointing step in which an insulating strip of the same type as in the first insulation-jointing step is applied on top of the heating layer joint 4j; a second insulation layer joint 5j is thus made and joins together the second insulating layers 5 of the two pipes 1 on top of the heating layer joint 4j.

The joints, 2j between tubes, 3j, 5j between insulating layers and 4j between heating layers form a joint 6 between the two tubes 1 which reproduces the stack of layers of each of the pipes 1 to form mechanical and electrical continuity (conduction and insulation) between the pipes 1.

Further, between each of the preceding steps or as a final step, a step of heating the joint 6 between the first and second pipes 1 may possibly be carried out in order to crosslink or solidify the matrices 11b.

Each joint 3j, 5j between insulating layers, and 4j between heating layers, may be made using independent suitable strips. That means to say an insulating composite strip for each insulation layer joint 3j, 5j and a composite strip 10 of the type of FIG. 2 or FIG. 4 for the heating layer joint 4j.

One single composite strip 10 of the type of FIG. 5, comprising two secondary portions 19, may potentially be used to form all three layers of the joint 6 in a single winding.

Figure 13:
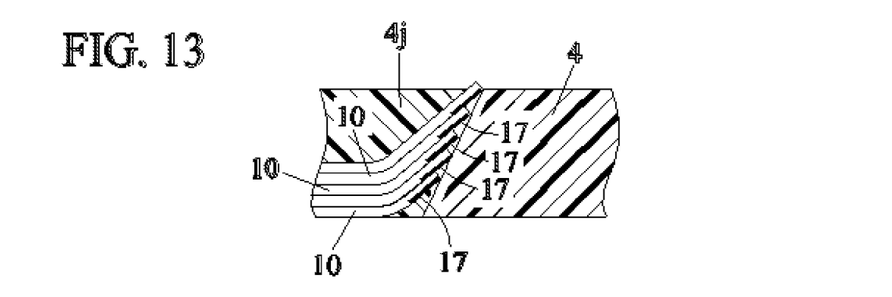
FIG. 13 is an enlarged view of the joint of FIG. 8 showing the plurality of elementary layers of which the composite strip is formed during the winding around the tube.

In the scenario as set out in the figures, in which the joint 6 has a conical shape, a composite strip 10 in the shape of a trapezium may advantageously be used. Thus, for each turn of the winding of the strip in the joint 6, as depicted in FIG. 13, the end edges 13a, 13b naturally offset from one another allowing better contact between the junction layer 17 and the heating layers 4 of each pipe 1. That also allows material to diffuse from the junction layer 17 over the entire area of contact with each heating layer 4. That improves the conductivity of this heating layer joint 4j (reducing contact electrical resistance).

The trapezium shape of the composite strip 10 is advantageously matched to the shapes of the ends of the pipes 1, so that as the composite strip 10 is wound it forms a joint 6 of a shape that complements the said ends of the pipes. Notably, the diameters of the pipes, the thickness of the composite strip 10 and the shape of the ends of the pipes need to be taken into consideration when establishing the trapezium shape of the composite strip 10.

Another method for forming a joint between two pipes 1 of the type of FIG. 1 will now be explained.

This method requires only a main strip 11 and the material of the junction layer. There is therefore no need to have a composite strip 10 prepared in advance and incorporating a junction layer 17. However, this method takes longer to implement in the field.

Finally, it is possible using one or more composite strips 10 and/or main strips 11, as set out in the present description, to make joints between pipes that are substantially identical and have several heating layers within the thickness of the pipes.

Notably, a composite strip 10 having an alternation of insulating portions (such as the secondary portion 19) and conducting portions (such as the main portion 18) can be produced. All the layers, and notably all the heating layers 4, are then jointed using one single winding of the said special-purpose composite strip 10.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A composite strip for joining a first pipe to a second pipe at a pipe joint, said composite strip extends in a main direction between a first and second ends, the composite strip comprising a main strip comprising first fibres embedded in a matrix, the first fibres being made of carbon, a material that conducts electricity, and the matrix being made of at least one polymer, the composite strip further comprising a junction layer formed of an electrically conducting junction material, the junction layer being placed above the main strip, only at the first and second ends of the composite strip, wherein the junction layer has the form of strips extending along the entire first and second ends, each of the said strips having, in the main direction, a width greater than 1 cm, and the junction layer overlays itself at each turn by the winding of the composite strip around the pipe joint, and wherein an electrical current is conducted into the composite strip for heating the first pipe and second pipe.

2. The composite strip according to claim 1, in which the junction layer has a thickness of between 0.05 mm and 1 mm.

3. The composite strip according to claim 1, in which the junction material is chosen from a list consisting of a polymer filled with electrically conducting particles, a polymer filled with metallic particles, a polymer filled with silver particles, a polymer filled with metalized carbon fibres, a polymer filled with copper fibres, and a polymer filled with braided copper fibres.

4. The composite strip according to claim 1, in which the first fibres extend substantially in the main direction.

5. The composite strip according to claim 1, in which the first fibres extend in a fibre direction forming a fibre angle with the main direction, the said fibre angle being between 0 degrees and 45 degrees.

6. The composite strip according to claim 5, in which the said fibre angle is between 0 degrees and 10 degrees.

7. The composite strip according to claim 1, in which the composite strip has the shape of a trapezium having two lateral edges that extend in directions parallel to one another and two end edges which belong to the ends of the composite strip and which extend in directions that converge towards one another, the junction layer extending parallel to each end edge.

8. The composite strip according to claim 7, in which the end edges form an angle of convergence of between 0.1 degree and 20 degrees.

9. The composite strip according to claim 8, in which the end edges form an angle of convergence of between 0.1 degree and 5 degrees.

10. The composite strip according to claim 1, further comprising a lateral portion in a secondary direction perpendicular to the main direction, the said lateral portion not comprising the said first fibres and comprising second fibres embedded in the matrix, the said second fibres being formed of a second material that is not electrically conducting.

11. The composite strip according to claim 10, in which the second material is glass.

12. The composite strip according to claim 1, in which the composite strip is flexible so that the first and second ends of the composite strip are brought into contact with a heating layer of said first pipe and a heating layer of said second pipe for electrical conduction through the junction layer to the composite strip.

* * * * *